Dec. 25, 1962  J. S. FREISMUTH  3,070,311
FLUID LINE THERMOSTAT
Filed Nov. 28, 1960

INVENTOR.
JOHN S. FREISMUTH
BY
WILSON, SETTLE, McRAE & CRAIG
ATTORNEYS

United States Patent Office 3,070,311
Patented Dec. 25, 1962

3,070,311
FLUID LINE THERMOSTAT
John S. Freismuth, St. Clair Shores, Mich., assignor to American Radiator & Standard Sanitary Corporation, New York, N.Y., a corporation of Delaware
Filed Nov. 28, 1960, Ser. No. 71,987
9 Claims. (Cl. 236—34.5)

This invention relates to a fluid line thermostat, as for example a thermostat for controlling or apportioning the flow of engine coolant between the coolant jacket of an internal combustion engine and the engine radiator.

One object of the present invention is to provide a rugged high strength thermostat which may be formed at least partly by low cost die casting procedures, the arrangement being characterized in that simplified single action dies and forming procedures may be employed in the manufacturing operations.

A further object is to provide a satisfactorily operating thermostat which can be formed with little or no machining of the parts.

An additional object is to provide a thermostat wherein the component parts can be easily assembled together and calibrated.

A general object of the invention is to provide a thermostat which combines the desired advantages of satisfactory temperature control under operational extremes, rugged construction, and low manufacturing cost.

Other objects of this invention will appear in the following description and appended claims, reference being had to the accompanying drawings forming a part of this specification wherein like reference characters designate corresponding parts in the several views.

Figure 1:
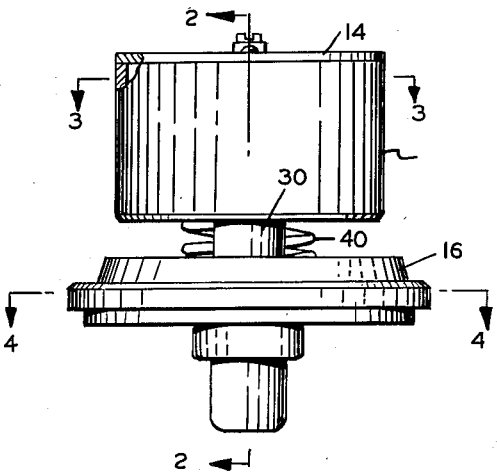
FIG. 1 is a side elevational view of one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is shown a thermostat of the bypass type wherein coolant from the jacket of an internal combustion engine (not shown) enters from below the thermostat and is directed either to the engine radiator or to a bypass around the radiator, depending on the position of the thermostat tubular metering valve 12.

Figure 2:
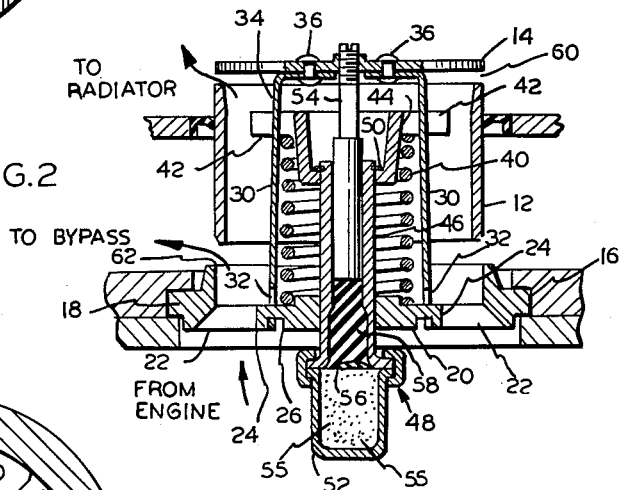
FIG. 2 is a sectional view on line 2—2 in FIG. 1.
Figure 4:
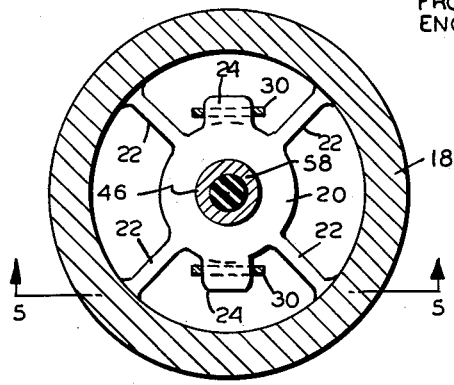
FIG. 4 is a sectional view on line 4—4 in FIG. 1.
Figure 5:
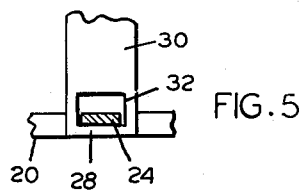
FIG. 5 is a fragmentary view on line 5—5 in FIG. 4.

As shown in FIG. 2 tubular valve 12 is axially movable between a seat-forming disc or wall structure 14 and a second seat-forming wall structure 16. Structure 16 comprises a peripheral thermostat-mounting portion 18 and a central portion 20, said portions being integrally interconnected by the four spoke walls 22. Central portion 20 includes two outwardly extending lugs 24, each of which is provided with an undercut at 26 to receive the retainer-forming end portion 28 of a strap or tie element 30. Each strap 30 is provided with an opening 32 therein to provide the specified retainer end portion.

As shown in the illustrative drawings the straps are formed as legs of a U-shaped strip 34, the web portion of which is secured to disc 14, as by rivets or other fastening means 36. The strap-disc assembly may be installed onto wall structure 16 by merely moving the assembly downwardly with the lower ends of straps 30 passing outside of lugs 24, and then pinching the straps toward one another so that the openings 32 pass around the lugs. The retainer portions 28 then may seat in cut outs 26 to retain the disc 14 and wall structure 16 in their desired assembled positions. A compression spring 40, to be described hereinafter, automatically exerts a tension on straps 30 to maintain the retainer portions 28 in cutaway areas 26 after complete assembly of the component parts. The complete sequence of assembly operations will be described hereinafter.

Figure 3:
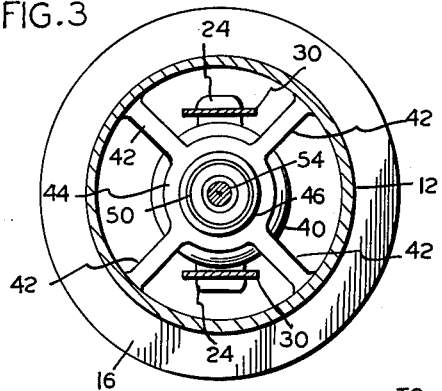
FIG. 3 is a sectional view on line 3—3 in FIG. 1.

Referring now to valve 12, said valve will be seen from FIG. 3 to be provided with four integral spokes 42 which extend inwardly to a hub portion 44. As best shown in FIG. 2, an opening is formed through hub portion 44 to receive the sleeve portion 46 of a thermostatic power element 48. A retainer ring 50 may be provided to retain the sleeve against downward movement relative to the hub.

The thermostatic power element is of conventional construction and comprises the aforementioned sleeve 46, a cup-like container 52, and a piston 54. The space within container 52 is occupied by a pellet 55 comprised of a mixture of solid thermostatic expansion material such as wax and dispersed heat-conductive particles such as copper or aluminum. As is conventional, a rubber diaphragm 56 and rubber plug 58 may be employed to transmit the volumetric expansion of the cup contents to the piston.

The upper end portion of the piston is secured to the disc 14, as by the cooperating threads and solder (not shown), and sleeve 46 is free to slide within portion 20 of structure 16. Therefore when the thermostat is installed in the coolant circulating portions of an engine any appreciable thermal expansion of pellet 55 will cause the entire assembly of members 46, 52 and 12 to move downwardly away from the seat-forming disc 14 to thus increase the coolant flow past seat 60 and decrease the coolant flow past seat 62. When sufficient coolant has been directed through the radiator to reduce the engine temperature to its desired equilibrium value the changed coolant temperature will cause a contraction in the pellet 55 volume such that spring 40 is enabled to return members 46, 52 and 12 toward seat 60. In this way the engine is maintained at a relatively constant value, safely low enough to prevent heat damage and high enough for efficient performance.

The tubular nature of element 12 is important in that it enables the valve element to be moved with lesser interference from the fluid than in the case of conventional poppet valves. Thus, the fluid opposes movement of the tubular valve only by reason of the fluid pressures developed on the narrow edges of the tubular element at its opposed ends. The areas presented by these edges are relatively small, and the fluid force in pounds on the valve to retard it is therefore necessarily of small magnitude. In addition, the fluid forces act on the opposite ends of the tubular valve and tend to oppose one another, so that in practice very little fluid force is present to oppose movement of the valve in either direction. Because of this fact a relatively light spring can be used for spring 40, and the component parts of the thermostatic power element can be reduced in size, thereby reducing costs of the assembly.

It will be noted from FIG. 2 that tubular element 12 is of slightly less major diameter than the internal diameter of seat 62 so that on fluid temperature increase the tubular element will slide within seat surface 62. By this arrangement the flow of the bypass will be substantially cut off while the tubular valve element still has a potential of further downward movement. This is of advantage in that it eliminates any possibility of parts damage such as might otherwise occur if thermostatic pellet 55 were to continue to want to expand after the tubular valve element had seated to close the bypass.

By a study of the figures it will be seen that structure 16 can be economically formed by a simple die casting operation; similarly the assembly of elements 12, 42, and 44 can be economically formed by a simple die casting operation. For most applications the tolerances achieved with die casting operations are sufficient so that no machining of the parts is required.

The previous description has dealt to some degree on the method of assembling disc structure 14 to the wall structure 16. It will be understood that prior to such assembly operations the thermostatic power element 48 is first inserted upwardly through structure 16, spring 40 is then positioned around the power element, and the tubular valve element structure is then secured to sleeve 46 by insertion of the locking ring 50 therearound. The spring force automatically holds the enlarged portion of the power element against the underside of structure 16 such that the parts assume substantially stable positions during assembly of the disc 14 and straps 30 into the thermostat.

The disc may be brought to a designated position by first screwing piston 54 a short distance onto the disc and then attaching the straps to lugs 24 as previously described. The final calibrating adjustment of parts may be made by further screwing up of the piston while the thermostat is located in a water bath. A solder connection between the disc and piston serves to retain the thermostat calibration. The connecting and calibrating operations may be easily performed from easily accessible areas above the thermostat.

The above description has proceeded on the basis of a specific practical embodiment of the invention. However it will be appreciated that minor changes in form and parts relation can be made without departing from the spirit of the invention as set forth in the appended claims

I claim:

1. A waterline thermostat comprising first and second fixedly spaced wall structures defining a pair of axially spaced valve seats; a tubular metering valve axially movable in the space between said seats to apportion relative flows therepast; a thermostatic power element comprising a piston extending from said first wall structure toward said second wall structure, a sleeve slidably encircling said piston and slidably extending through said second wall structure, a container carried by the sleeve at the end thereof adjacent said second wall structure, and thermostatic expansion material within the container; means connecting the sleeve with the tubular metering valve; and spring means biasing the metering valve toward said first wall structure, whereby on fluid temperature increase the sleeve, container and metering valve are moved by the expansion material away from said first wall structure, and on fluid temperature decrease the sleeve, container and metering valve are moved by the spring means toward said first wall structure.

2. The combination of claim 1 wherein said first wall structure comprises a disc, and said second wall structure comprises a mounting wall having a central opening receiving the aforementioned sleeve and a series of flow apertures spaced around said central opening to conduct fluid into the tubular metering valve and over the valve seats.

3. The combination of claim 1 wherein the tubular metering valve has a lesser diameter than the valve seat formed by said second wall structure so that on abnormal fluid temperature increase the metering valve is enabled to slide therethrough without parts breakage.

4. A waterline thermostat comprising first and second spaced wall structures defining first and second axially spaced valve seats; a hollow metering valve axially movable between said seats to apportion relative flows therepast; a thermostatic power element having oppositely acting portions directed against the first seat and metering valve, respectively, to thereby move said valve in the direction of the second seat on fluid temperature increase; detachable tie means tying the first and second wall structures together; and spring means biasing the metering valve toward said first seat so as to place the tie means in a tensioned condition such that it is enabled to hold the two wall structures in place.

5. In a thermostatic valve, first and second fixedly spaced walls defining first and second spaced valve seats, a hollow, elongated valve element axially movable in the space between said valve seats to close against one or the other of said seats, an actuating rod connected to said first wall and extending toward said second wall, guide means slidably mounted on said actuating rod and extending slidably through said second wall, means connecting said guide means to said valve element, means biasing said valve element toward said first wall, and thermostatic power means connected to said guide means for moving said guide means relative to said actuating rod.

6. In a thermostatic valve, first and second spaced walls defining first and second spaced valve seats, strap means fixedly connected at one end to one of said walls and connected by releasable locking means at the other end to said other wall, a hollow elongated valve element axially movable in the space between said valve seats to close against one or the other of said valve seats, an actuating rod connected to said first wall and extending toward said second wall axially through said hollow valve element, guide means slidably mounted on said actuating rod and extending slidably through said second wall, means connecting said guide means to said valve element, means biasing said valve element toward said first wall, and thermostatic power means connected to said guide means for moving said guide means relative to said actuating rod.

7. The valve defined in claim 6 wherein said releasable locking connection comprises openings formed in said straps adapted to fit over lugs formed on said other wall.

8. The valve defined in claim 6 wherein said straps are fixedly connected to said first wall and releasably locked to said second wall.

9. In a thermostatic valve, a first annular wall defining an annular valve seat and having a support spider therein defining an axially disposed guide opening, a disc fixedly spaced from said first wall and supported therefrom in axial alignment to define a second valve seat, a hollow elongated valve element axially movable between said valve seats to close against one or the other of said seats, a piston connected at one end to said disc and positioned coaxial to and extending toward said guide opening, a tubular cylinder slidable over said piston and extending slidably through said guide opening, means connecting said cylinder to said valve element, means biasing said valve element toward said disc, and thermostatic power means connected to said cylinder for moving said cylinder relative to said piston.

References Cited in the file of this patent

UNITED STATES PATENTS

| | | |
|---|---|---|
| 2,457,991 | Fernstrum | Jan. 4, 1949 |
| 2,584,877 | Hoffman et al. | Feb. 5, 1952 |
| 2,810,523 | Branson | Oct. 22, 1957 |
| 2,810,524 | Puster | Oct. 22, 1957 |
| 2,829,834 | Drapeau et al. | Apr. 8, 1958 |